United States Patent [19]

Kahlen

[11] Patent Number: 5,593,704
[45] Date of Patent: Jan. 14, 1997

[54] HEAD ASSEMBLY FOR BLOW-EXTRUDING A TUBULAR PLASTIC FOIL

[75] Inventor: Wilhelm Kahlen, Troisdorf, Germany

[73] Assignee: Reifenhauser GmbH & Co. Maschinenfabrik, Troisdorf, Germany

[21] Appl. No.: 442,060

[22] Filed: May 16, 1995

[30] Foreign Application Priority Data

May 25, 1994 [DE] Germany .................. 44 18 133.7

[51] Int. Cl.⁶ ............................................... B29C 47/88
[52] U.S. Cl. .................. 425/72.1; 425/326.1; 425/387.1
[58] Field of Search .............................. 425/72.1, 326.1, 425/387.1; 264/565, 566, 569

[56] References Cited

U.S. PATENT DOCUMENTS

| | | | |
|---|---|---|---|
| 2,966,700 | 1/1961 | Dyer et al. | 425/326.1 X |
| 3,902,832 | 9/1975 | Gregory et al. | 425/326.1 X |
| 3,990,828 | 11/1976 | Reifenhauser | 425/72.1 X |
| 4,105,380 | 8/1978 | Zimmermann | 425/72.1 |
| 4,601,649 | 7/1986 | Upmeier | 425/326.1 X |
| 4,624,823 | 11/1986 | Audureau et al. | 425/326.1 X |
| 4,643,657 | 2/1987 | Achelpohl et al. | 425/387.1 X |
| 4,955,802 | 9/1990 | Halter et al. | 425/72.1 |
| 5,322,431 | 6/1994 | Kahlen et al. | 425/72.1 |

*Primary Examiner*—Richard L. Chiesa
*Attorney, Agent, or Firm*—Herbert Dubno; Andrew Wilford

[57] ABSTRACT

An apparatus for blow extruding a tubular plastic foil has a nozzle having an upwardly open annular mouth generally centered on a longitudinal axis for upwardly extruding a tubular plastic strand and an inner tube extending upward from the nozzle within the mouth thereof, having an upper end spaced axially from the mouth, and formed between the upper end and the mouth with at least one radially throughgoing hole. A stabilizer head carried on the inner-tube upper end is formed with passages having inner ends opening into the inner tube at the upper end thereof and outwardly directed outer ends. An outer tube surrounding the inner tube defines an inner longitudinal passage therewith, extends upward from the nozzle within the mouth thereof, and has an upper end above the hole and below the inner-tube upper end. A partition extends crosswise across the inner tube immediately below the hole and subdivides the inner tube into a lower tube section and an upper tube section and a blocking element engaged between the outer-tube upper end and the inner tube above the hole closes the upper-tube upper end. A guide sleeve between the head and the outer tube has a foraminous upper portion, an imperforate lower portion. One or more radially extending conduits below the partition between the inner and outer tubes form a flow path between an outer passage between the strand and the outer tube and an interior of the lower inner-tube section.

7 Claims, 2 Drawing Sheets

HEAD ASSEMBLY FOR BLOW-EXTRUDING A TUBULAR PLASTIC FOIL

FIELD OF THE INVENTION

The present invention relates to an apparatus for blow-extruding a tubular plastic foil or film. More particularly this invention concerns a head assembly for such an apparatus.

BACKGROUND OF THE INVENTION

A tubular plastic foil of the type used to make bags is formed by extruding a tubular plastic strand from an annular mouth of a nozzle. A stabilizer extends centrally from this nozzle and has an open outer end. Cooling air is directed radially inward at the strand as it exits from the nozzle and is also injected into the annular space between the strand and the stabilizer. The cooling air trapped in the strand serves both to expand and cool it, and is aspirated at some longitudinal spacing from the nozzle into the stabilizer.

This arrangement is typically oriented vertically with the strand moving up and away from the nozzle. After being expanded by air pressure inside it, the tube is flattened and then is usually cross-welded and perforated or cut into bags.

The stabilizer is typically of circular section and has a closed outer end and perforations at this outer end through which the cooling air is aspirated. Such an arrangement is satisfactory so long as the neck part of the strand, that is the strand before it is radially expanded to the desired size, is relatively short. When, however, high-pressure polyethylene is being extruded this neck is fairly long, so that it is fairly common for the resin to come into contact with the intake end of the stabilizer tube and become caught, forcing one to shut down the machine and clear the jam.

It has been suggested to avoid this problem by providing along the stream of cooling air flowing along the outside of the strand and spaced from this strand a sleeve which is provided over its length with spaced circularly annular disks which extend into the flow of the outer stream of cooling air. Such a system is only a poor partial solution to the problem in that jams still occur.

In U.S. Pat. No. 4,955,802 the apparatus has a nozzle having an annular mouth generally centered on a longitudinal axis for longitudinally outwardly extruding a tubular plastic strand, an inner stabilizing tube extending longitudinally outward from the nozzle within the mouth thereof and having an outer end spaced a predetermined longitudinal distance from the mouth, and an outer stabilizing tube surrounding the inner tube and defining a longitudinal passage therewith, extending longitudinally outward from the nozzle within the mouth thereof, and having an outer end lying between the outer end of the inner tube and the mouth. The passage opens outward between the outer ends. Cool air is fed to the passage at the mouth and to a space defined between the strand where it emerges from the mouth and the outer tube for flow of this cooling air longitudinally outward between the strand and the outer tube and from the outer end of the outer tube. Thus the strand is expanded transversely generally at the outer ends of the tubes. The cooling air is withdrawn from within the strand by drawing this cooling air into the outer end of the inner tube and longitudinally backward through the inner tube.

Similarly in U.S. Pat. No. 5,322,431 this problem is at least partially solved by distributing over the length of the device formed by the inner tube and the outer jacket or tubular member, between the outlet at the foot side and the outlet at the head side, at least one blowing air intake device at which the blowing air is withdrawn from the flow passage formed by the clearance between the jacket of the device and the thermoplastic tube, into the inner tube, and toward the head of the device, but spaced from the outlet at the head side. At least one further blowing air outlet for feeding the blowing air into the flow passage is provided between the jacket and the thermoplastic tube. The intake as well as the additional blowing-air outlet are aerodynamically matched with respect to flows therethrough to stabilize the plastic tube and/or the film balloon.

Both such arrangements are fairly efficient but could stand some improvement.

OBJECTS OF THE INVENTION

It is therefore an object of the present invention to provide an improved blow-extruding system.

Another object is the provision of such an improved blow-extruding system which overcomes the above-given disadvantages, that is which operates on the long-neck principle but which surely prevents the workpiece from being damaged by the stabilizer.

SUMMARY OF THE INVENTION

An apparatus for blow extruding a tubular plastic foil has according to the invention a nozzle having an upwardly open annular mouth generally centered on a longitudinal axis for longitudinally upwardly extruding a tubular plastic strand and an inner tube extending longitudinally upward from the nozzle within the mouth thereof, having an upper end spaced axially from the mouth, and formed between the upper end and the mouth with at least one radially throughgoing hole. A stabilizer head carried on the inner-tube upper end is formed with passages having inner ends opening into the inner tube at the upper end thereof and outwardly directed outer ends. An outer tube surrounding the inner tube defines an inner longitudinal passage therewith, extends longitudinally upward from the nozzle within the mouth thereof, and has an upper end above the hole and below the inner-tube upper end. A partition extends crosswise across the inner tube immediately below the hole and subdivides the inner tube into a lower tube section and an upper tube section and a blocking element engaged between the outer-tube upper end and the inner tube above the hole closes the upper-tube upper end. A guide sleeve has a foraminous upper portion, an imperforate lower portion, and an upper end secured to the head, and a lower end secured to the outer tube below the partition and forming an annular outer passage with the outer sleeve. One or more radially extending conduits below the partition between the inner and outer tubes form a flow path between the outer passage and an interior of the lower inner-tube section. Cooling air is fed to the inner passage at the mouth and to a space defined between the strand where it emerges from the mouth and the outer tube for flow of this cooling air longitudinally upward between the strand and the outer tube and along the inner passage and through the hole into the inner-tube upper section and thence through the passages of the head and outward so that the strand is expanded transversely into a tubular plastic foil. This air is withdrawn from within the strand by drawing it into the outer passage, through the conduit, and thence down along the inner-tube lower section.

The invention is based on the surprising discovery that the substantial spacing between the stabilizer-head rings and the long neck of the workpiece, just where it transitions to the expanded foil, is not necessary. Instead it is more advantageous to actually let the workpiece contact the stabilizer at this location. The invention thus employs the inventive foraminous grill element constituting the upper portion of the guide sleeve. It allows the blow air to be guided into the inner tube so that a low pressure or suction is created in the region of this stabilizer grill element that pulls the workpiece in against the grill element immediately upstream of where it is expanded. The resultant stabilization is therefore excellent.

According to this invention the upper foraminous portion is generally cylindrical and centered on the axis. It can also be generally frustoconical, upwardly flared, and centered on the axis. The latter system somewhat expands the plastic strand.

The upper foraminous portion can be formed of a grill-work of bars or wires or of perforated sheet metal. In the latter case it is coated with a material having a very low coefficient of friction, e.g. polytetrafluoroethylene. The plastic being blow-extruded is normally high-density polyethylene.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
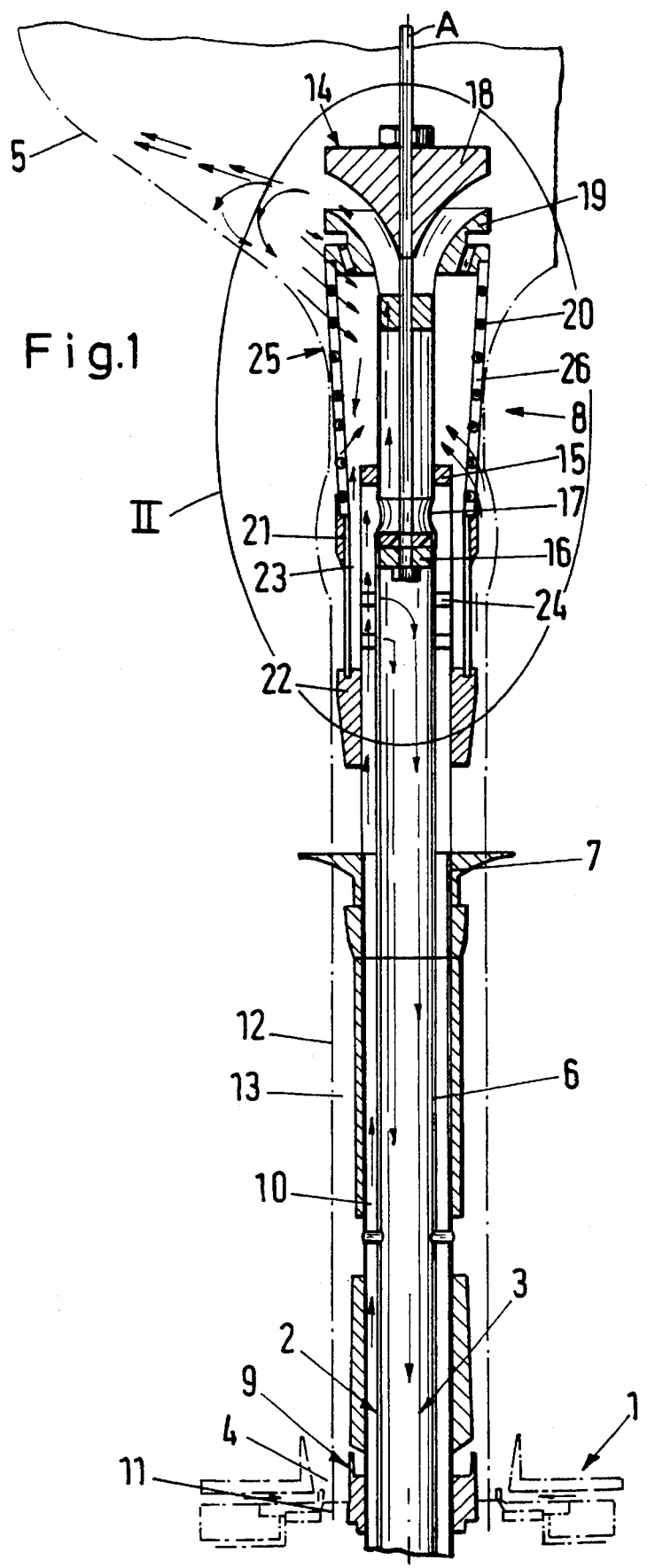
FIG. 1 is a partly diagrammatic axial section through an extruding apparatus equipped with a head assembly according to this invention.

As seen in FIG. 1 an extruder head 1 has an annular gap 11 centered on a vertical axis A and from which issues a plastic tube 12 that is expended at a neck region 25 to form a tubular foil 5 of relatively large diameter. The extruder head 1 has a blow-air outlet 2 and a blow-air intake 3 and outside cool air is blown at 4 on the tube 12 issuing from it.

An inner tube 6 having a lower end fixed at a connection 9 in the head 1 extends upward along the axis A as does an outer tube 7. A head 8 mounted on the upper outer ends of the tubes 6 and 7 serves to stabilize the workpiece 5, 12, 25. An inner passage 10 formed between the tubes 6 and 7 is connected to the blow-air output 2 to receive blow air therefrom while the outer tube 7 forms another passage 13 with the small-diameter extruded tube 12 that also receives blow air at 4. The interior of the lower end of the tube 6 is connected to the blow-air intake or return 3.

Figure 2:
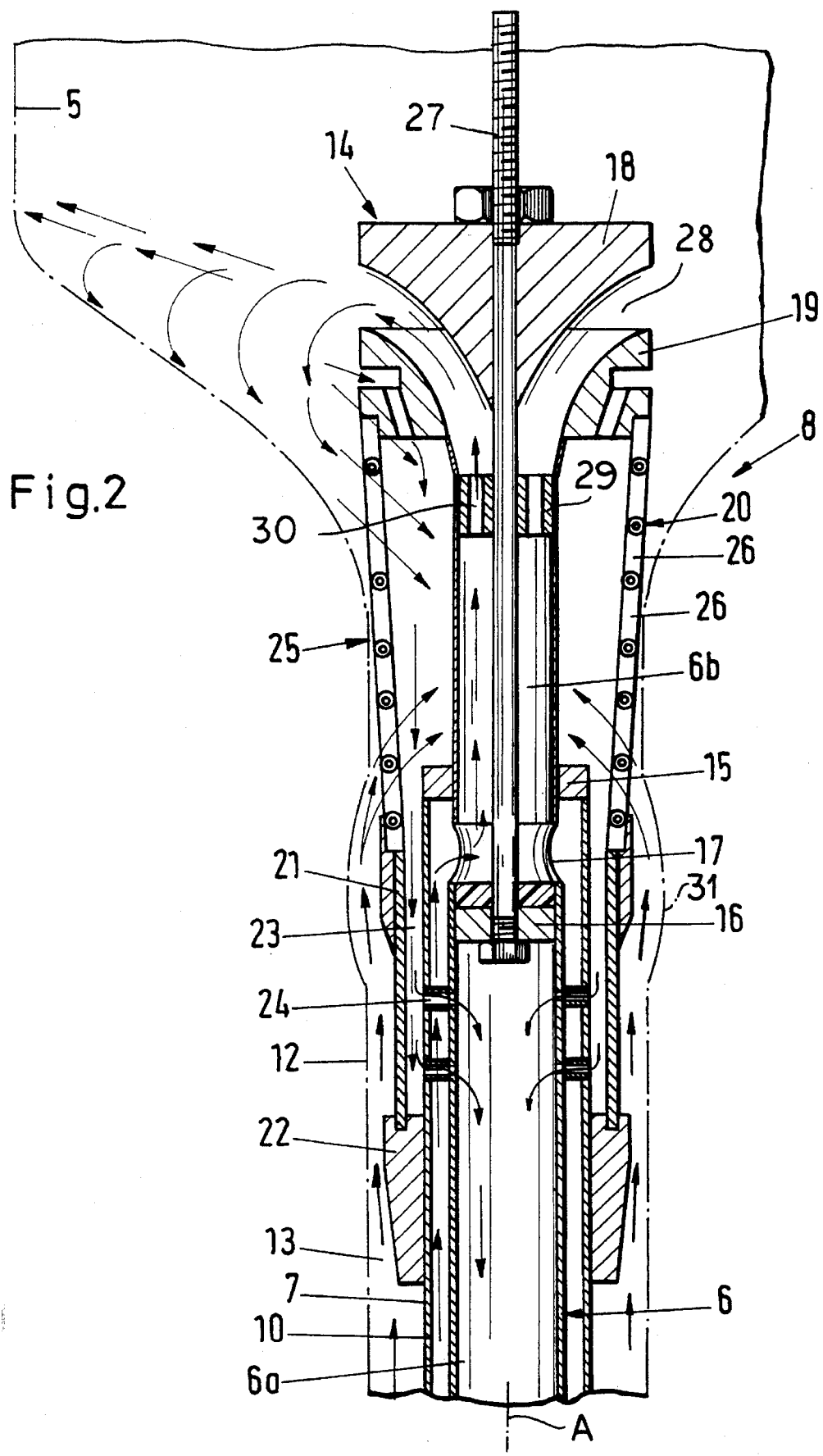
FIG. 2 is a larger-scale view of the detail indicated at II in FIG. 1.

As best shown in FIG. 2, the head 8 includes an upper end deflector 14 comprising a pair of parts 18 and 19 mounted on a rod 27 fixed in the tube 6 and forming an outwardly opening passage 28. The tube 6 is subdivided by a partition disk 16 in which the lower end of the rod 27 is fixed into a lower passage or compartment 6a and an upper passage or compartment 6b, and is formed immediately above the partition disk 16 with radially throughgoing holes 17. The upper end of the tube 6 is provided with a spacer ring 29 formed with axially throughgoing holes 30. A blocking ring 15 is provided between the upper end of the outer tube 7, which is shorter than the core tube 6, and the tube 6. Thus air rising from the output 2 in the inner passage 10 between the tubes 6 and 7 will be forced in through the holes 17 into the upper part 6b of the tube 6 and then through the holes 30 to the passage 28 whence it will exit into the expanded tube part 5.

A collar 22 on the outer tube 7 well below the partition disk 16 carries the lower end of an outermost tube or sleeve 21 which defines an annular outer passage 23 with the outside of the tube 7 and whose upper end is fixed to an upwardly flaring foraminous sleeve or grill 20 whose upper end in turn is secured in the deflector part 19. The grill 20 can be formed of perforated sheet metal with holes 26 and is coated with a low-friction material such as polytetrafluoroethylene. Small radially extending tubes or conduits 24 have outer ends opening into the outer passage 23 and inner ends into the interior of the lower part 6a of the tube 6 and traverse the inner passage 10. Thus return air is sucked into the upper end of the outer passage 23 and thence passes through the conduits 24 into the lower tube part 6a and thence to the intake 3.

Thus air rising in the inner passage 10 will be blown out of the top of the head assembly from the passage 28. Meanwhile air rising in the space 13 between the outer tube 7 and the lower part 12 of the workpiece will bow it out at 31 at the lower end of the grill 20. Most of this latter flow of blow air will be sucked back down into the outer passage 23 along with the air blown in from the passages 28. This pulls the long neck of the workpiece back in at 25 against the foraminous grill 20.

I claim:

1. An apparatus for blow extruding a tubular plastic foil, the apparatus comprising:

means including a nozzle having an upwardly open annular mouth substantially centered on a longitudinal axis for longitudinally upwardly extruding a tubular plastic strand;

an inner tube extending longitudinally upward from the nozzle within the mouth thereof, having an upper end spaced axially from the mouth, and formed between the upper end and the mouth with at least one radially throughgoing hole;

a stabilizer head carried on the inner-tube upper end and formed with passages having inner ends opening into the inner tube at the upper end thereof and outwardly directed outer ends;

an outer tube surrounding the inner tube and defining an inner longitudinal passage therewith, extending longitudinally upward from the nozzle within the mouth thereof, and having an upper end above the hole and below the inner-tube upper end;

a partition extending crosswise across the inner tube immediately below the hole and subdividing the inner tube into a lower tube section and an upper tube section;

a blocking element engaged between the outer-tube upper end and the inner tube above the hole and closing the upper-tube upper end;

a sleeve having a foraminous upper portion, an imperforate lower portion, and an upper end secured to the head and a lower end secured to the outer tube below the partition and forming an annular outer passage with the outer sleeve;

at least one radially extending conduit below the partition between the inner and outer tubes and forming a flow path between the outer passage and an interior of the lower inner-tube section;

means for feeding cooling air to the inner passage at the mouth and to a space defined between the strand where it emerges from the mouth and the outer tube for flow of this cooling air longitudinally upward between the strand and the outer tube and along the inner passage and through the hole into the inner-tube upper section and thence through the passages of the head and outward, whereby the strand is expanded transversely into a tubular plastic foil; and means connected to the inner-tube lower end for withdrawing the cooling air from within the strand by drawing the cooling air into the outer passage, through the conduit, and thence down along the inner-tube lower section.

2. The blow-extruding apparatus defined in claim 1 wherein the upper foraminous portion is substantially cylindrical and centered on the axis.

3. The blow-extruding apparatus defined in claim 1 wherein the upper foraminous portion is substantially frustoconical, upwardly flared, and centered on the axis.

4. The blow-extruding apparatus defined in claim 1 wherein the upper foraminous portion is formed of perforated sheet metal.

5. The blow-extruding apparatus defined in claim 1 wherein the upper foraminous portion is coated with a material having a very low coefficient of friction.

6. The blow-extruding apparatus defined in claim 5 wherein the material is polytetrafluoroethylene.

7. The blow-extruding apparatus defined in claim 1 wherein the plastic is high-density polyethylene.

* * * * *